United States Patent
Li et al.

(10) Patent No.: US 11,566,312 B2
(45) Date of Patent: Jan. 31, 2023

(54) MANUFACTURING PROCESS OF HIGH-STRENGTH ALUMINUM ALLOY WIRE/STRIP

(71) Applicant: JIANGSU UNIVERSITY OF TECHNOLOGY, Changzhou (CN)

(72) Inventors: Xiaoping Li, Changzhou (CN); Xiao Liu, Changzhou (CN); Runzhou Li, Changzhou (CN); Yang Zhang, Changzhou (CN); Weining Lei, Changzhou (CN)

(73) Assignee: JIANGSU UNIVERSITY OF TECHNOLOGY, Changzhou (CN)

( * ) Notice: Subject to any disclaimer, the term of this patent is extended or adjusted under 35 U.S.C. 154(b) by 16 days.

(21) Appl. No.: 17/409,811

(22) Filed: Aug. 24, 2021

(65) Prior Publication Data
US 2022/0205073 A1 Jun. 30, 2022

(30) Foreign Application Priority Data
Dec. 30, 2020 (CN) .......................... 202011612419.4

(51) Int. Cl.
| | | |
|---|---|---|
| *C22F 1/053* | (2006.01) | |
| *C21D 9/52* | (2006.01) | |
| *C21D 9/573* | (2006.01) | |
| *C22C 1/02* | (2006.01) | |
| *C22C 21/10* | (2006.01) | |
| *B23K 101/32* | (2006.01) | |
| *B23K 103/10* | (2006.01) | |
| *B23K 35/02* | (2006.01) | |
| *B23K 35/28* | (2006.01) | |

(52) U.S. Cl.
CPC .............. *C22F 1/053* (2013.01); *C21D 9/525* (2013.01); *C21D 9/5732* (2013.01); *C22C 1/026* (2013.01); *C22C 21/10* (2013.01); *B23K 35/0261* (2013.01); *B23K 35/288* (2013.01); *B23K 2101/32* (2018.08); *B23K 2103/10* (2018.08)

(58) Field of Classification Search
CPC . C22F 1/053; C22F 1/02; C21D 9/525; C21D 9/5732; C21D 9/0075; C22C 1/026; C22C 21/10; B23K 35/0261; B23K 35/288; B23K 2101/32; B23K 2103/10; Y02P 10/25; B21C 37/02; B21C 37/045; B22D 11/06

See application file for complete search history.

(56) References Cited

U.S. PATENT DOCUMENTS

| | | | | |
|---|---|---|---|---|
| 4,816,087 A | * | 3/1989 | Cho ........................ | C22F 1/04 148/692 |
| 2008/0299000 A1 | * | 12/2008 | Gheorghe ............... | C22C 21/10 148/552 |
| 2021/0254196 A1 | * | 8/2021 | Croteau .................. | B33Y 40/20 |
| 2021/0404037 A1 | * | 12/2021 | Bürger .................... | C22C 21/10 |

FOREIGN PATENT DOCUMENTS

CN  101695753 A  *  4/2010

OTHER PUBLICATIONS

CN-101695753-A, Zhang et al., machine translation (Year: 2010).*

* cited by examiner

*Primary Examiner* — John A Hevey
(74) *Attorney, Agent, or Firm* — Bayramoglu Law Offices LLC

(57) ABSTRACT

A manufacturing process of a high-strength aluminum alloy wire/strip includes the following steps: A. subjecting an alloy to smelting and spray forming to obtain a high-strength Al—Zn—Mg—Cu aluminum alloy blank; B. subjecting the blank to semi-solid upset forging to form an ingot; C. subjecting the ingot to hot extrusion and then to vacuum annealing to form a coiled material; D. subjecting the coiled material to hot continuous rolling to obtain a wire blank; and E. subjecting the wire blank to solution heat treatment, multiple stretching treatments, annealing, and multiple continuous stretching treatments to obtain the high-strength aluminum alloy wire/strip. The high-strength aluminum alloy wire/strip has the characteristics of fine and compact grains, uniform structure, clear grain boundaries, no precipitates, and no layered structure affecting the stretching performance.

11 Claims, No Drawings

MANUFACTURING PROCESS OF HIGH-STRENGTH ALUMINUM ALLOY WIRE/STRIP

CROSS REFERENCE TO THE RELATED APPLICATIONS

This application is based upon and claims priority to Chinese Patent Application No. 202011612419.4, filed on Dec. 30, 2020, the entire contents of which are incorporated herein by reference.

TECHNICAL FIELD

The present disclosure belongs to the technical field of metal materials and processing technologies thereof, and in particular, relates to a manufacturing process of a high-strength Al—Zn—Mg—Cu aluminum alloy wire/strip that can be used for welding and additive manufacturing.

BACKGROUND

High-strength aluminum alloys are widely used in aerospace, oil drilling, automobiles, electronics, ships, nuclear power, and other fields. At present, aluminum alloys used in structural materials of civil aircraft around the world are 70% to 80% by weight, most of which are high-strength aluminum alloys. With the rapid development of the modern aerospace industry, high-strength Al—Zn—Mg—Cu aluminum alloys have broad application prospects. The high-strength Al—Zn—Mg—Cu aluminum alloys can be machined into components of different shapes for different application fields, and thus the research on processing and shaping technology for aluminum alloys is valuable in practical applications.

The high-strength Al—Zn—Mg—Cu aluminum alloy has a high specific strength, but faces large difficulties in processing and shaping (especially in welding) due to the poor plastic toughness and weldability. Specifically, the disadvantages are as follows. (1) It is difficult to produce high-strength Al—Zn—Mg—Cu aluminum alloy wires (strips) that can be used for welding and additive manufacturing. Stretching is the main plastic deformation method for obtaining a metal wire. High-strength Al—Zn—Mg—Cu aluminum alloys have difficulty in plastic deformation and are prone to cracks (causing fragmentation) during extrusion and stretching processes due to high Zn content and high brittleness. A high-strength Al—Zn—Mg—Cu aluminum alloy blank with fine grains, uniform structure, clear grain boundaries, and without precipitate can be obtained by spray forming, which improves the plasticity and toughness. However, using the spray forming method fails to get a compact blank, such that a layered structure is easily formed, which affects the performance. (2) High-strength Al—Zn—Mg—Cu aluminum alloys have poor weldability, such that it is hard to form welding seams and it is obviously prone to hot cracking. Especially, since there is no corresponding available high-strength Al—Zn—Mg—Cu aluminum alloy welding wire, in a welding process of high-strength Al—Zn—Mg—Cu aluminum alloy, the 5-series aluminum alloy wire or aluminum alloy wires of other series having different structures and mechanical properties from a base metal are typically used for welding, and obtained welding seams have poor mechanical properties, which limits the application of high-strength aluminum alloys, especially ultra-high-strength aluminum alloys. Further, the above defects greatly limit the processing and application of high-strength Al—Zn—Mg—Cu aluminum alloy components. (3) In the field of metal additive manufacturing, fused filament additive manufacturing is an effective way to improve the quality and production efficiency of high-strength aluminum alloy components. However, such materials and additive manufacturing of components are restricted due to the lack of corresponding aluminum alloy wires at present.

SUMMARY

In order to solve the problem that the Al—Zn—Mg—Cu alloy has poor plastic toughness and weldability in the prior art, the present disclosure provides a manufacturing process of a high-strength aluminum alloy wire/strip.

To solve the above technical problem, the present disclosure adopts the following technical solutions: A manufacturing process of a high-strength aluminum alloy wire/strip is provided, including the following steps:

A. subjecting an alloy to smelting and spray forming to obtain a high-strength Al—Zn—Mg—Cu aluminum alloy blank;

B. subjecting the blank to semi-solid upset forging to form an ingot;

C. subjecting the ingot to hot extrusion and then to vacuum annealing to form a coiled material;

D. subjecting the coiled material to hot continuous rolling to obtain a wire blank; and E. subjecting the wire blank to solution heat treatment, multiple stretching treatments, annealing, and multiple continuous stretching treatments to obtain the high-strength aluminum alloy wire/strip.

Preferably, the high-strength Al—Zn—Mg—Cu aluminum alloy may have a composition of Al—xZn—yMg—zCu, and the components may have weight percentages as follows: $3.5\% \leq x \leq 22\%$, $1.5\% \leq y \leq 10\%$, $1.0\% \leq z \leq 10\%$, and the other is Al.

Further, the high-strength Al—Zn—Mg—Cu aluminum alloy blank obtained in step A may have a diameter of 90 mm to 600 mm and a length of 200 mm to 1,200 mm.

Preferably, the semi-solid upset forging in step B may be conducted at 460° C. to 575° C., and the ingot formed after the semi-solid upset forging may have a diameter of 30 mm to 330 mm.

Preferably, in step C, the hot extrusion may be conducted at 380° C. to 480° C. and an extrusion ratio of (20-90):1, and a coiled ingot obtained after subjecting the ingot to hot extrusion may have a diameter of 5 mm to 10 mm.

Specifically, in step C, the vacuum annealing may include: keeping at 200° C. to 300° C. for 10 h to 24 h, and cooling in a furnace.

Further, the wire blank in step D may have a diameter/thickness of 3.4 mm to 3.6 mm.

Preferably, in step E, the solution heat treatment may include: keeping at 420° C. to 570° C. for 2 h, and quenching with water.

Specifically, in step E, the annealing may include: keeping at 200° C. to 400° C. for 10 h to 24 h, and cooling in a furnace; the multiple continuous stretching treatments may be conducted at a compression ratio of 5% to 25%; and the wire/strip may have a diameter/thickness of 0.8 mm to 3.2 mm.

Preferably, the hot continuous rolling may be conducted in the manner of skew rolling.

Beneficial effects: In the present disclosure, the spray forming is adopted to obtain a high-strength Al—Zn—Mg—Cu aluminum alloy blank with fine grains, uniform structure, clear grain boundaries, and no precipitate; the semi-solid upset forging is adopted to eliminate layered structures formed from the spray forming and make the blank compact; and solution heat treatment is conducted before stretching, which can effectively avoid wire breakage and cracks during a stretching process. The wire obtained in the present disclosure has the characteristics of fine and compact grains, uniform structure, clear grain boundaries, no precipitates, and no layered structure affecting the stretching performance, and exhibits prominent mechanical properties, structural properties, and welding properties. The present disclosure is expected to broaden the application range of high-strength Al—Zn—Mg—Cu aluminum alloy components, improve the welding of high-strength Al—Zn—Mg—Cu aluminum alloy components, and provide high-quality raw materials for high-strength Al—Zn—Mg—Cu aluminum alloy welding and additive manufacturing.

DETAILED DESCRIPTION OF THE EMBODIMENTS

Example 1

7055 aluminum alloy was subjected to smelting and spray forming to obtain a blank with a diameter of 220 mm; then the blank was subjected to semi-solid upset forging at 460° C. to obtain an ingot with a diameter of 176 mm; the ingot was subjected to hot extrusion at 380° C. and an extrusion ratio of 86:1 to obtain a coiled bar material with a diameter of 6 mm (multiple products were produced at a time); the coiled bar material was kept at 300° C. for 10 h in a vacuum annealing furnace and then cooled with the furnace, and then subjected to hot continuous rolling by skew rolling, such that the coiled bar material with a diameter of 6 mm was rolled into a thick wire blank with a diameter of 3.6 mm; the thick wire blank was subjected to solution heat treatment (keeping at 420° C. for 2 h and quenching with water), multiple stretching treatments, intermediate annealing (keeping at 300° C. for 15 h and cooling in a furnace), and multiple continuous stretching treatments with a continuous wire stretching machine at a compression ratio of 6% to 8% to obtain a high-strength 7055Al—Zn—Mg—Cu aluminum alloy wire with a diameter of 0.8 mm to 1.6 mm.

Example 2

7075 aluminum alloy was subjected to smelting and spray forming to obtain a blank with a diameter of 220 mm; then the blank was subjected to semi-solid upset forging at 575° C. to obtain an ingot with a diameter of 228 mm; the ingot was subjected to hot extrusion at 460° C. and an extrusion ratio of 52:1 to obtain a coiled bar material with a diameter of 10 mm (multiple products were produced at a time); the coiled bar material was kept at 200° C. for 24 h in a vacuum annealing furnace and then cooled with the furnace, and then subjected to hot continuous rolling, such that the coiled bar material with a diameter of 10 mm was rolled into a thick wire blank with a diameter of 3.4 mm; the thick wire blank was subjected to solution heat treatment (keeping at 570° C. for 2 h and quenching with water), multiple stretching treatments, intermediate annealing (keeping at 400° C. for 10 h and cooling in a furnace), and multiple continuous stretching treatments with a continuous wire stretching machine at a compression ratio of 6% to 10% to obtain a high-strength 7075Al—Zn—Mg—Cu aluminum alloy wire with a diameter of 0.8 mm to 1.6 mm.

Example 3

High-zinc Al—12Zn—2.4Mg—1.1Cu aluminum alloy was subjected to smelting and spray forming to obtain a blank with a diameter of 220 mm; then the blank was subjected to semi-solid upset forging at 500° C. to obtain an ingot with a diameter of 90 mm; the ingot was subjected to hot extrusion at 480° C. and an extrusion ratio of 20:1 to obtain a coiled bar material with a diameter of 6 mm (multiple products were produced at a time); the coiled bar material was kept at 250° C. for 20 h in a vacuum annealing furnace and then cooled with the furnace, and then subjected to hot continuous rolling, such that the coiled bar material with a diameter of 5 mm was rolled into a thick wire blank with a diameter of 3.6 mm; the thick wire blank was subjected to solution heat treatment (keeping at 500° C. for 2 h and quenching with water), multiple stretching treatments, intermediate annealing (keeping at 200° C. for 24 h and cooling in a furnace), and multiple continuous stretching treatments with a continuous wire stretching machine at a compression ratio of 15% to 20% to obtain a high-zinc Al—12Zn—2.4Mg—1.1Cu aluminum alloy wire with a diameter of 0.8 mm to 1.6 mm.

TABLE 1

Properties of the high-strength Al—Zn—Mg—Cu aluminum alloy wires in the examples of the present disclosure

| | Example No. | | | | | | | | |
|---|---|---|---|---|---|---|---|---|---|
| | 1 | | | 2 | | | 3 | | |
| | Material name | | | | | | | | |
| | 7055 | | | 7075 | | | Al—12Zn—2.4Mg—1.1Cu | | |
| | Wire specification | | | | | | | | |
| | Φ0.8 mm | Φ1.2 mm | Φ1.6 mm | Φ0.8 mm | Φ1.2 mm | Φ1.6 mm | Φ0.8 mm | Φ1.2 mm | Φ1.6 mm |
| Yield strength/MPa | 350 | 363 | 353 | 378 | 432 | 417 | 368 | 371 | 354 |
| Tensile strength/MPa | 420 | 412 | 386 | 480 | 456 | 432 | 482 | 464 | 412 |
| Elongation/% | 16 | 15 | 20 | 8 | 12 | 14 | 8 | 12 | 14 |
| Elastic modulus/GPa | 72 | 72 | 72 | 70 | 70 | 70 | 69 | 69 | 69 |
| Hardness/HB | 103 | 96 | 90 | 120 | 116 | 106 | 125 | 114 | 101 |
| Density/g/cm$^3$ | 2.7 | 2.7 | 2.7 | 2.8 | 2.8 | 2.8 | 2.9 | 2.9 | 2.9 |

TABLE 2

Room temperature tensile mechanical properties of welding parts of the high-strength
Al—Zn—Mg—Cu aluminum alloy wires in the examples of the present disclosure

| Example No. | Sample name | Tensile strength, Rm (MPa) | Specified plastic extension strength, $R_{r0.2}$ (MPa) | Elongation at break A(%) |
|---|---|---|---|---|
| 1 | 7055φ1.2 wire welding part (T6 heat treatment) | 667 | 575 | 11.5 |
|  |  | 656 | 565 | 12.5 |
|  | 7055φ1.2 wire welding part (no heat treatment) | 430 | 283 | 7.5 |
|  |  | — | — | — |
| 2 | 7075φ1.2 wire welding part (T6 heat treatment) | 655 | 565 | 12.5 |
|  |  | 634 | 562 | 12.0 |
|  | 7075φ1.2 wire welding part (no heat treatment) | 388 | 294 | 10.0 |
|  |  | — | — | — |
| 3 | Al12Zn2.4Mg1.1Cuφ1.2 wire welding part (T6 heat treatment) | 695 | 612 | 12.5 |
|  |  | 689 | 606 | 13.0 |
|  | Al12Zn2.4Mg1.1Cuφ1.2 wire welding part (no heat treatment) | 416 | 308 | 9.5 |
|  |  | — | — | — |

Note:
The room temperature tensile mechanical properties of the welding parts were tested as follows: The welding wire manufactured in each example was used to weld base metal aluminum alloys with the same composition as the welding wire. Some test samples were subjected to T6 heat treatment, and some test samples were subjected to no heat treatment (for example, the 7055φ1.2 wire welding part (T6 heat treatment) refers to a test sample obtained by welding 7055 base metals with the 7055 wire with a diameter of 1.2 mm manufactured in Example 1 and subjecting a welded product to T6 heat treatment). In accordance with Metal Material Tensile Experiment Part 1 in GB/T228.1-2010: Room Temperature Tensile Method, a mechanical performance test was conducted, where two replicates were set for each heat-treated sample.

The specific implementations of the present disclosure are described in detail above, but the present disclosure is not limited to the above-mentioned implementations. Various changes can be made within the scope of knowledge possessed by those of ordinary skill in the art.

What is claimed is:

1. A manufacturing process of a high-strength aluminum alloy wire/strip, comprising the following steps:
    A. subjecting an alloy to smelting and spray forming to obtain a high-strength Al—Zn—Mg—Cu aluminum alloy blank;
    B. subjecting the high-strength Al—Zn—Mg—Cu aluminum alloy blank to semi-solid upset forging to form an ingot;
    C. subjecting the ingot to hot extrusion and then to vacuum annealing to form a coiled material;
    D. subjecting the coiled material to hot continuous rolling to obtain a wire blank; and
    E. subjecting the wire blank to solution heat treatment, multiple stretching treatments, annealing, and multiple continuous stretching treatments to obtain the high-strength aluminum alloy wire/strip.

2. The manufacturing process according to claim 1, wherein the high-strength Al—Zn—Mg—Cu aluminum alloy has a composition of Al—xZn—yMg—zCu, and the components have weight percentages as follows: 3.5%≤x≤22%, 1.5%≤y≤10%, 1.0%≤z≤10%, and the other is Al.

3. The manufacturing process according to claim 1, wherein the high-strength Al—Zn—Mg—Cu aluminum alloy blank obtained in step A has a diameter of 90 mm to 600 mm and a length of 200 mm to 1,200 mm.

4. The manufacturing process according to claim 1, wherein the semi-solid upset forging in step B is conducted at 460° C. to 575° C., and the ingot formed after the semi-solid upset forging has a diameter of 30 mm to 330 mm.

5. The manufacturing process according to claim 1, wherein in step C, the hot extrusion is conducted at 380° C. to 480° C. and at an extrusion ratio of (20-90):1, and a coiled ingot obtained after subjecting the ingot to hot extrusion has a diameter/thickness of 5 mm to 10 mm.

6. The manufacturing process according to claim 1, wherein in step C, the vacuum annealing is conducted at 200° C. to 300° C. for 10 h to 24 h, and then cooling in a furnace is performed.

7. The manufacturing process according to claim 1, wherein the wire blank in step D has a diameter/thickness of 3.4 mm to 3.6 mm.

8. The manufacturing process according to claim 1, wherein in step E, the solution heat treatment is conducted at 420° C. to 570° C. for 2 h, and then quenching in water is performed.

9. The manufacturing process according to claim 1, wherein in step E, the annealing is conducted at 200° C. to 400° C. for 10 h to 24 h, and then cooling in a furnace is performed; the multiple continuous stretching treatments are conducted at a compression ratio of 5% to 25%; and the high-strength aluminum alloy wire/strip has a diameter/thickness of 0.8 mm to 3.2 mm.

10. The manufacturing process according to claim 1, wherein the hot continuous rolling is conducted in the manner of skew rolling.

11. The manufacturing process according to claim 3, wherein the semi-solid upset forging in step B is conducted at 460° C. to 575° C., and the ingot formed after the semi-solid upset forging has a diameter of 30 mm to 330 mm.

* * * * *